United States Patent
Nunomaki et al.

(10) Patent No.: US 8,432,134 B2
(45) Date of Patent: Apr. 30, 2013

(54) ELECTRONIC APPARATUS WITH REMAINING BATTERY POWER INDICATING FUNCTION

(75) Inventors: Takashi Nunomaki, Tokyo (JP); Satoshi Ebato, Tokyo (JP)

(73) Assignee: Sony Corporation, Tokyo (JP)

(*) Notice: Subject to any disclaimer, the term of this patent is extended or adjusted under 35 U.S.C. 154(b) by 153 days.

(21) Appl. No.: 12/953,983

(22) Filed: Nov. 24, 2010

(65) Prior Publication Data

US 2011/0068941 A1 Mar. 24, 2011

Related U.S. Application Data

(60) Division of application No. 12/353,342, filed on Jan. 14, 2009, now Pat. No. 7,969,118, which is a continuation of application No. 10/437,511, filed on May 14, 2003, now Pat. No. 7,508,168.

(30) Foreign Application Priority Data

May 16, 2002 (JP) ................................. 2002-141818

(51) Int. Cl.
*H02J 7/00* (2006.01)
(52) U.S. Cl.
USPC ........................... 320/132; 320/136; 324/427
(58) Field of Classification Search .................. 320/132, 320/136; 324/427; 429/92
See application file for complete search history.

(56) References Cited

U.S. PATENT DOCUMENTS

| | | | |
|---|---|---|---|
| 5,898,290 A | 4/1999 | Beard et al. | |
| 6,174,617 B1 | 1/2001 | Hiratsuka et al. | |
| 6,222,348 B1 | 4/2001 | Sato et al. | |
| 6,366,809 B1 | 4/2002 | Olson et al. | |
| 6,522,361 B2 | 2/2003 | Higuchi et al. | |
| 6,791,605 B1* | 9/2004 | Reele et al. | 348/207.99 |
| 6,819,356 B1 | 11/2004 | Yumoto | |
| 6,947,035 B1 | 9/2005 | Shiraga | |
| 6,995,543 B2 | 2/2006 | Nunomaki et al. | |
| 2003/0184307 A1 | 10/2003 | Kozlowski et al. | |

FOREIGN PATENT DOCUMENTS

| | | |
|---|---|---|
| JP | 09-297166 | 11/1997 |
| JP | 11-243645 | 9/1999 |
| JP | 2000-350371 | 12/2000 |
| JP | 2002-75467 | 3/2002 |

* cited by examiner

*Primary Examiner* — Edward Tso
*Assistant Examiner* — Aaron Piggush
(74) *Attorney, Agent, or Firm* — Frommer Lawrence & Haug LLP; William S. Frommer; Ellen Marcie Emas

(57) ABSTRACT

An electronic apparatus has a multiplicity of display units including an electronic viewfinder and a liquid crystal display (LCD) panel. The apparatus has various display modes. The remaining battery power, i.e., estimated amounts of remaining battery times relative to a current remaining battery capacity, are calculated for the respective display modes. The calculated remaining battery power is collectively displayed as the remaining battery power information on the respective display units. The remaining battery power can be obtained for all the display modes even when the battery is being charged, so that a user can always grasp the remaining battery power of any of the display modes.

17 Claims, 7 Drawing Sheets

F I G. 1
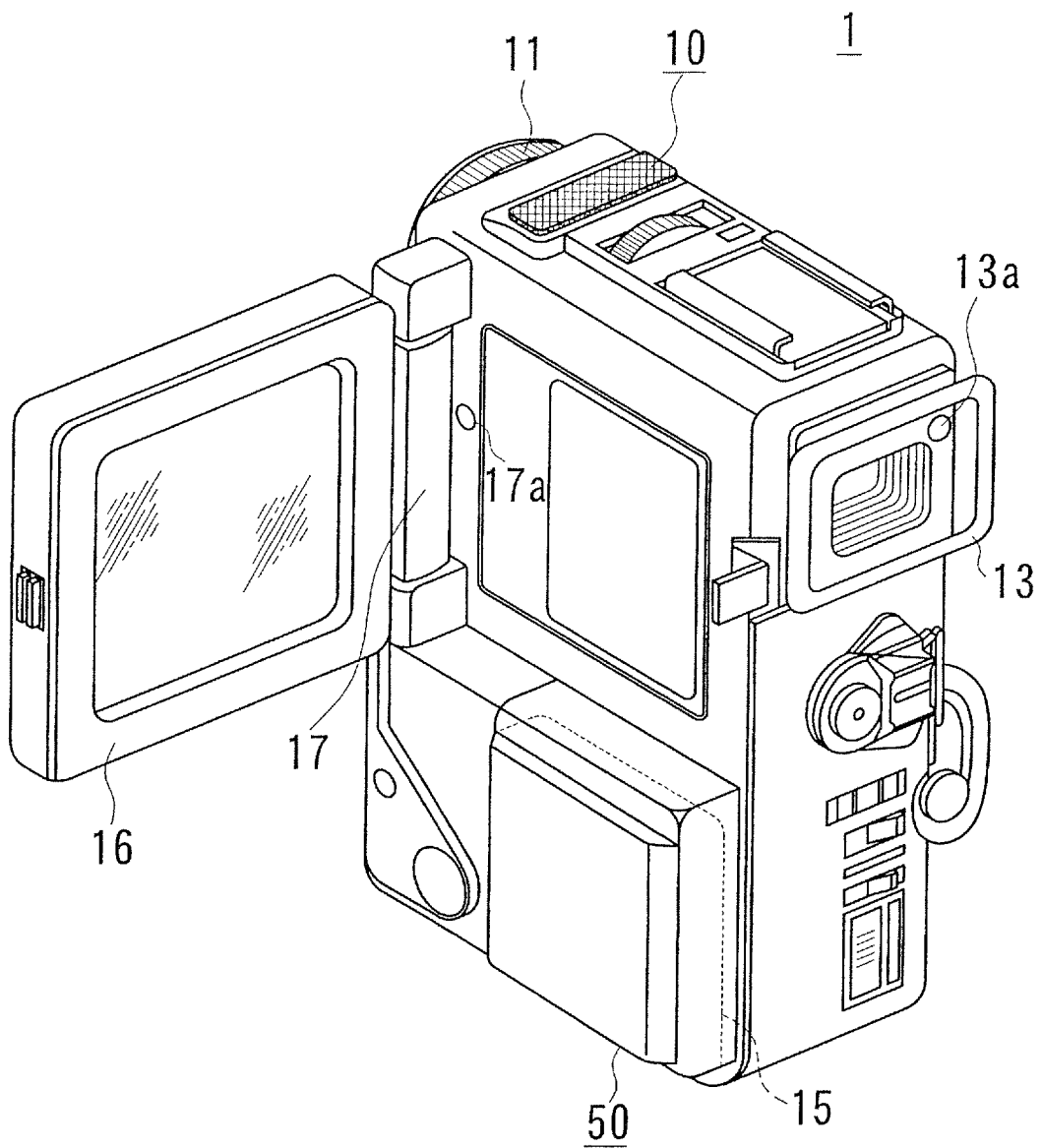

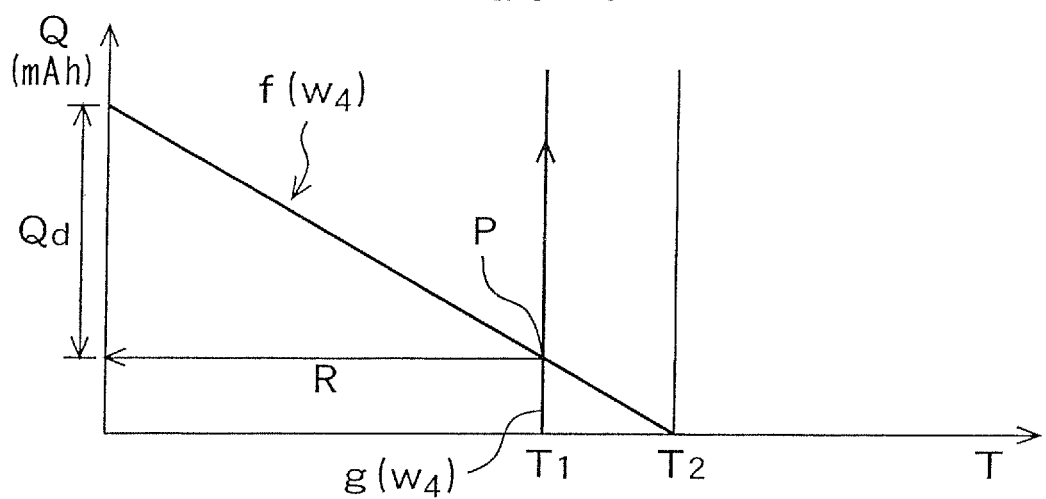
F I G. 7

ELECTRONIC APPARATUS WITH REMAINING BATTERY POWER INDICATING FUNCTION

This is a divisional application of application Ser. No. 12/353,342 filed Jan. 14, 2009 now U.S. Pat. No. 7,969,118 which is a continuation of application Ser. No. 10/437,511 filed May 14, 2003 now U.S. Pat. No. 7,508,168, which is entitled to the priority filing date of Japanese Application No. 2002-141818 filed May 16, 2002, the entirety of which is incorporated herein by reference.

BACKGROUND OF THE INVENTION

1. Field of the Invention

The invention relates to an electronic apparatus with a remaining-battery-power-indicating function. More particularly, it relates to an electronic apparatus such as portable video camera, cellular phones, portable digital assistants, and the apparatus having a network communication function, which are capable of indicating remaining battery power of a battery pack for supplying electric power to the apparatus.

2. Related Art

A well known portable video camera, which is a typical electronic apparatus, comprises a main body thereof for imaging subject and recording image of the subject and a removable battery pack for supplying electric power to the main body. The main body includes an image pickup device for imaging the subject, a recording unit for recording the information signal of the subject imaged by the image pickup device on a recording medium such as a tape cassette, and a display unit for displaying the image of the subject captured.

Recently, in most cases, the display unit includes a display panel in the form of an LCD panel, for convenience, in addition to an electronic viewfinder (EVF). A user for shooting can look at the subject through such the viewfinder. On the LCD panel, the user, and others as well, can see what is the subject from the image displayed thereon.

Video cameras of this kind often display remaining battery power on their display units to allow the user to show how long the battery pack will be available in the portable use condition of the video cameras. Video cameras disclosed in Japanese Patent Publications H9-297166 and 2000-350371 have two display units consisting of a viewfinder and an LCD panel, respectively. These cameras can detect the use status or use mode of each of the video cameras using a particular display unit (the mode will be referred to as "display mode"). They can also calculate power consumption by or at the present time according to the display modes. They also display an estimated amount of remaining battery time in a single charge based on remaining battery power, namely, remaining battery capacity, on the display unit (the viewfinder or the LCD panel) thereof.

Knowing the estimated amount of remaining battery time for the current display mode, the user can easily grasp how long he or she can continue shooting for this display mode. The user, therefore, can prepare for recharging or replacement of the battery in time, thereby avoiding a malfunction in battery during shooting.

It is noted, however, that the estimated amount of remaining battery time displayed on the respective display units mentioned above merely represents time when the battery is available by battery exhaustion in a current display mode. For example, if only the viewfinder is used now, the estimated amount of remaining battery time shown in the viewfinder indicates estimated available time based on an assumption that the video camera will be subsequently used only in the viewfinder mode. Hence, if the user switches the display mode from the viewfinder to, for example, the LCD panel, the user fails to know how long the battery will be available from now in the LCD mode.

In actuality, various display modes exist in addition to the first display mode using only the viewfinder. For example, there are a second display mode using only the LCD panel, a third display mode using the viewfinder and the LCD panel at a same time, and a fourth display mode using an LCD panel in transferring data via a network if the apparatus has a network communication function, by which an imaged picture is transferred via the network such as the Internet.

Since power consumption rates in these display modes differ greatly, the estimated amount of remaining battery time differs greatly depending on which of the display modes is subsequently used.

In the conventional electronic apparatus, the display unit displays the estimated amount of remaining battery time based on only the current display mode. Consequently, when the display mode is switched from a first to a second display mode, for example, the estimated amount of remaining battery time is re-calculated for the second display mode before it is displayed. This disadvantageously requires certain time for re-calculating the estimated amount of remaining battery time and displaying the estimated amount of remaining battery time thus re-calculated in the second display mode in addition to time for switching the display mode from one to the other. Therefore, it will be very convenient for the user if he or she can access the estimated amounts of remaining battery times for all the possible display modes at once.

Furthermore, in conventional video cameras, the display function for displaying various pieces of information is cut off during charging. Consequently, although a user can see charged condition of the battery, there is no way of directly knowing the estimated amount of remaining battery time in respective display modes during charging. Even if the display unit is modified to display the estimated amount of remaining battery time, it is still impossible then to predict, during charging, whether the shooting will be carried out using only the viewfinder or only the LCD panel. Therefore, displaying the estimated amount of remaining battery time in any of the display modes is suitably determined by a predetermined default display mode.

If the estimated amounts of remaining battery times for all the display modes are known during charging, then it is conceivable that the user may hold sufficient battery capacity for his or her preference in a particular display mode, though the battery is not fully charged. Therefore, he or she can then quit charging of the battery pack without waiting for full charging thereof. This would permit the user to cut down charging time to avoid wasting time in fully charging the battery.

The present invention alleviates the problems as mentioned above. It is an object of the present invention to present an electronic apparatus with a remaining-battery-power-indicating function, namely, display function for displaying the remaining battery power or the estimated amounts of remaining battery times in all the display modes that the apparatus may take simultaneously or selectively.

SUMMARY OF THE INVENTION

According to the present invention, the foregoing object is attained by an electronic apparatus having a remaining-battery-power-indicating function. The apparatus comprises a main body having a multiplicity of display units and a battery assembly for supplying power to the main body. The battery assembly includes battery cell(s) and controller for allowing generating information on a discharge current from the battery cell(s) and transmitting to the main body the information thus generated.

The main body further includes remaining battery power information generator for generating remaining battery power information by calculating estimated amounts of remaining battery times of the battery assembly relative to a current remaining battery capacity according to display modes of the display unit. The display units display the estimated amounts of remaining battery times thus calculated thereon as the remaining battery power information.

The invention allows the display units to display at least the estimated amounts of remaining battery times of the battery assembly in a single charge for all the display modes that the electronic apparatus may take. For example, when the electronic apparatus is a portable video camera, it may take the first through the fourth display modes. Namely, a first display mode using an electronic viewfinder, a second display mode using a display panel, a third display mode using both the electronic viewfinder and the display panel, and a fourth display mode using a display panel for communicating information via a communications line may be taken.

The estimated amounts of remaining battery times of the battery assembly for the respective display modes are displayed simultaneously. If the display area provided for the display units is too small for displaying all the estimated amounts of remaining battery times simultaneously, they can be selectively or switchably displayed. The estimated amounts of remaining battery times are illustratively displayed in numeric characters.

According to an aspect of the present invention, the display units also simultaneously display battery charging status and the estimated amounts of remaining battery times. This is preferably represented using a bar chart. For example, the battery charging status can be represented in the form of a horizontal black bar with its length being indicated as the percentage of the charging capacity. The battery charging status may be also represented within a battery bar mark with a mount of charge being represented by oblique lines increasing in numbers following in order of the charged amount.

Whether the bar may be displayed horizontally depends on the area dimensions of the display unit. A display unit includes a viewing finder, an LCD panel, and a display part having a shape of a strip provided on a closed surface of the LCD panel, which is a layout occurred when the LCD panel is not in use.

According to another aspect of the present invention, the electronic apparatus allows the display units to display the estimated amounts of remaining battery times of the battery assembly even when the battery assembly is being charged. If a monitor switch is provided, the electronic apparatus allows the display units to display the estimated amounts of remaining battery times of the battery assembly only when the switch is operated. In addition to the charging condition, the estimated amounts of remaining battery times of the battery assembly may be also displayed when the electronic apparatus is in use or on the standby condition thereof.

Thus, according to the invention, the user can conveniently grasp the estimated amounts of remaining battery times of the battery assembly in a single charge for each display mode at once.

Since the estimated amounts of remaining battery times are displayed even when the battery assembly is being charged, the user can cut down charging not to waste time in extra charging of the battery before using the electronic apparatus. Compared with a conventional arrangement in which the estimated amounts of remaining battery times of the battery assembly for the respective display modes are calculated every time the display mode is switched, the invention has an advantage over such arrangement in that the estimated amounts of remaining battery times can be displayed more quickly if they are selectively and switchably displayed because all the estimated amounts of remaining battery times for the respective display modes are calculated and displayed on the display units.

Since information on the power consumption rates necessary to calculate the remaining battery power information in the respective display modes is pre-installed in calculator, consumption rates need not be calculated every time the use condition (display mode) of the main body of the electronic apparatus is changed, thereby enabling the remaining battery power information to be displayed in a stable condition.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 1 is a schematic perspective view of a video camera of the invention as seen from behind thereof;

FIG. 7 is a graph showing a discharge characteristic of a battery pack when an electronic apparatus operates in a fourth display mode using the LED in data communication wherein the characteristic is represented based on a remaining battery capacity as a function of time;

DETAILED DESCRIPTION OF PREFERRED EMBODIMENTS

Figure 2:
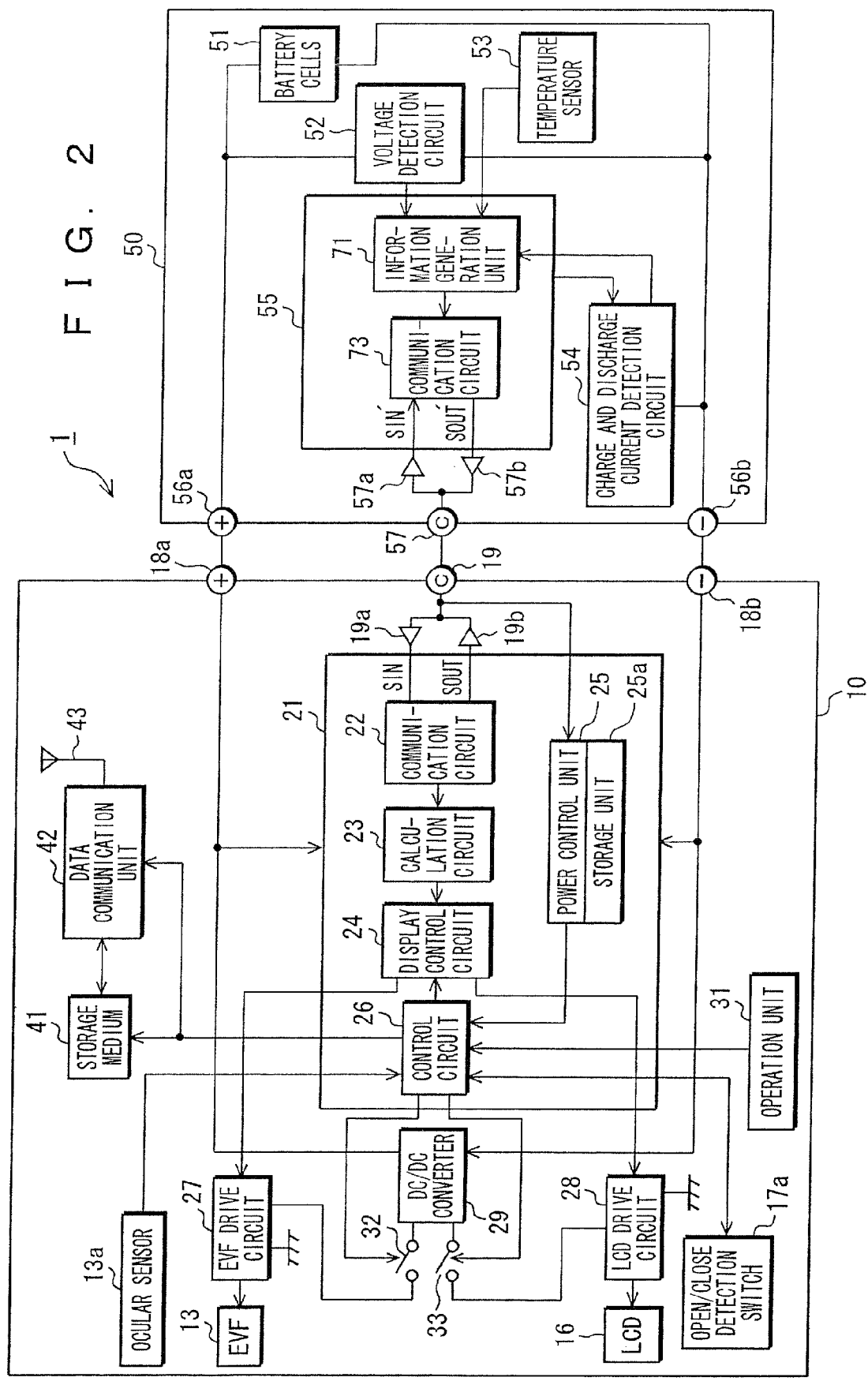
FIG. 2 is a block diagram of the video camera of the invention.

Referring to the drawings, the invention will now be described in detail with reference to a portable video camera embodying an electronic apparatus according to the invention. A video camera 1 has a main body 10 thereof and a battery pack 50 for supplying power to the main body 10 as shown in FIG. 1. The main body 10 has a portable size, and has a substantially parallelepiped shape in the illustrated case. The main body 10 has an imaging device 11 comprising on the front side thereof an optical system that includes a CCD element for imaging subject. Mounted on the back of the main body 10 or on opposite side thereof relative to the imaging device 11 is an electronic viewfinder (EVF) 13, for example, serving as a first display unit. The viewfinder 13 has a pressure switch (or an ocular sensor) 13a that can be activated as the viewer's eye is placed on the finder to display an image of the subject. Through the viewfinder 13, the viewer may view the image of the subject, remaining battery power, namely, estimated amounts of remaining battery times in a single charge for the respective display modes, and function modes, only when the viewer's eye is placed on the finder.

Provided on one side portion (right side portion in FIG. 1) of the main body 10 is a recording medium storage unit (not shown) for loading a tape cassette utilizing a magnetic tape or a disk cartridge utilizing a recordable disk. Provided in the bottom section of the other side portion (left side portion in FIG. 1) of the main body 10 is a battery installation unit 15, in which a battery pack for supplying electric power to the main body 10 is removably installed.

The battery installation unit 15 is provided with battery terminals 18a and 18b for allowing the electric power of the battery pack 50 to be supplied, and a communication terminal 19 for communication of data, as shown in FIG. 2, with the battery pack 50.

Provided on the upper portion of the other side of the main body 10 is a second display unit in the form of an LCD panel 16, for example, for displaying an image of the subject during the shooting. The image is also displayed in the viewfinder 13. The LCD panel 16 is mounted on the main body 10 via a hinge 17 with the panel 16 being swung opened and closed. The LCD panel 16 can also rotate about an axis (not shown) provided with the hinge 17. The LCD panel 16 becomes operable when it is opened as shown in FIG. 1. The ON/OFF status of the LCD panel 16 is detected by an OPEN/CLOSE detection switch 17a mounted on the main body 10.

The battery pack 50 to be installed in the battery installation unit 15 includes rechargeable battery cell(s) such as lithium ion cell(s). The battery pack 50 has terminals 56a and 56b for supplying its power to the main body 10, and a communications terminal 57 for communicating information with the main body 10, as shown in FIG. 2. Different kinds of the battery packs having different permissible power loads can be installed as the battery pack 50. In this case, however, every kind of the battery packs has the same output voltage.

FIG. 2 is a block diagram representation of the circuits in the video camera 1 embodying the invention. When the battery pack 50 is installed in the main body 10, the main body 10 transmits a battery information request signal Sout, which is amplified by a buffer amplifier 19b, through the communication terminal 19 provided in the battery installation unit 15. In response to the battery information request signal Sout, the battery pack 50 transmits information on the battery pack 50 (referred to as "battery information") Sout' to the main body 10 via a buffer amplifier 57b.

The main body 10 has a microcomputer 21 including a communication circuit 22 (as communication means) for receiving the battery information Sout' from the battery pack 50. The microcomputer 21 also includes a calculation circuit (as calculation means) 23 for calculating remaining battery power of the battery pack 50 based on the battery information Sout' received by the communication circuit 22 to generating remaining battery power information. The microcomputer 21 further includes a display control circuit (as display control means) 24 for allowing generating a display signal based on the remaining battery power information generated by the calculation circuit 23.

The battery information Sout' is supplied to the calculation circuit 23 via a buffer amplifier 19a and the communication circuit 22. The battery information Sout' includes information on the integrated amount of discharge current obtained by multiplying discharge current of the battery pack 50 by discharge time, and temperature information indicative of temperature of the battery cells 51 installed in the battery pack 50. The temperature information, when needed, is supplied to the calculation circuit 23.

A memory (not shown) provided in the calculation circuit 23 previously stores first power consumption rate information W1 describing the power consumed by the viewfinder 13 in a first display mode, second power consumption rate information W2 describing the power consumed by the LCD panel 16 in a second display mode, third power consumption rate information W3 describing the power consumed by the viewfinder 13 and the LCD panel 16 in a third display mode, and fourth power consumption rate information W4 describing the power consumed by the LCD panel 16 in communicating information via a communication network in a fourth display mode. Note that the communicated information includes record information collected in the process of shooting. The record information and the like may be stored in storage medium 41 as well as in a card-shaped or strip-shaped semiconductor memory (not shown).

Figure 3:
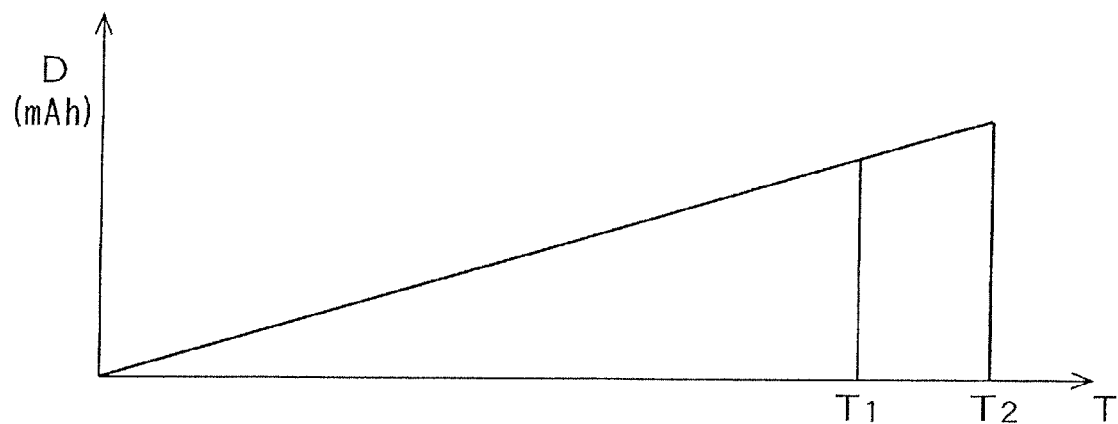
FIG. 3 is a graph showing integrated amount of current discharged from a battery pack as a function of time.

Incidentally, when the battery pack 50 discharges current at a constant consumed power rate, an integrated amount D of the discharged current is substantially proportional to the discharge time T, as shown in FIG. 3. Permissible lowest voltage (referred to as "battery's end voltage") of the battery pack 50 is determined far the video camera 1. The video camera 1 can be used up to time T1 that corresponds to the battery's end voltage. It, however, cannot be used after the time T1 to time T2 for completely discharging. Actually usable voltage of the battery pack 50 for the video camera 1 is current voltage of the battery minus the battery's end voltage.

Discharge characteristics f(wi) of the battery pack 50 according to various display modes are shown in FIGS. 4 through 7 where "i" indicates each of the display modes (in the illustrated cases, the display modes are the first through fourth display modes). In each of the graphs of these figures, the remaining battery capacity Q is indicated along the vertical axis thereof and the discharge time T is indicated along the horizontal axis thereof.

Figure 4:
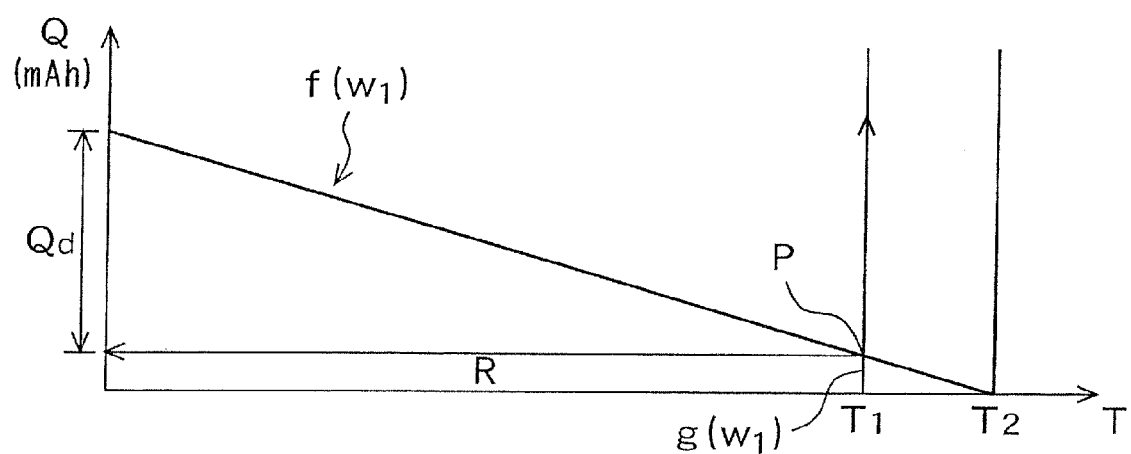
FIG. 4 is a graph showing a discharge characteristic of a battery pack when an electronic apparatus operates in a first display mode using only a viewfinder wherein the characteristic is represented based on a remaining battery capacity as a function of time.

For example, in FIG. 4, a point "P" corresponding to the battery's end voltage of the battery pack 50 is set for the video camera 1 on the discharge characteristic f(w1) of the battery pack 50. With respect to a coordinate system in which the origin is taken at the point P corresponding to the battery's end voltage, the ordinate represents the remaining battery capacity g(w1) and the abscissa represents an estimate amount of remaining battery time R, namely, a period of time until the battery pack 50 reaches its end voltage in a single charge. In other words, when the remaining battery capacity Q is obtained at a point on the discharge characteristics f(wi) of the battery pack 50, a current estimated amount of remaining battery time R (in which the video camera 1 will be available) starting from time corresponding to the remaining battery capacity Q and reaching time T1 corresponding to the point P can be calculated.

Figure 5:
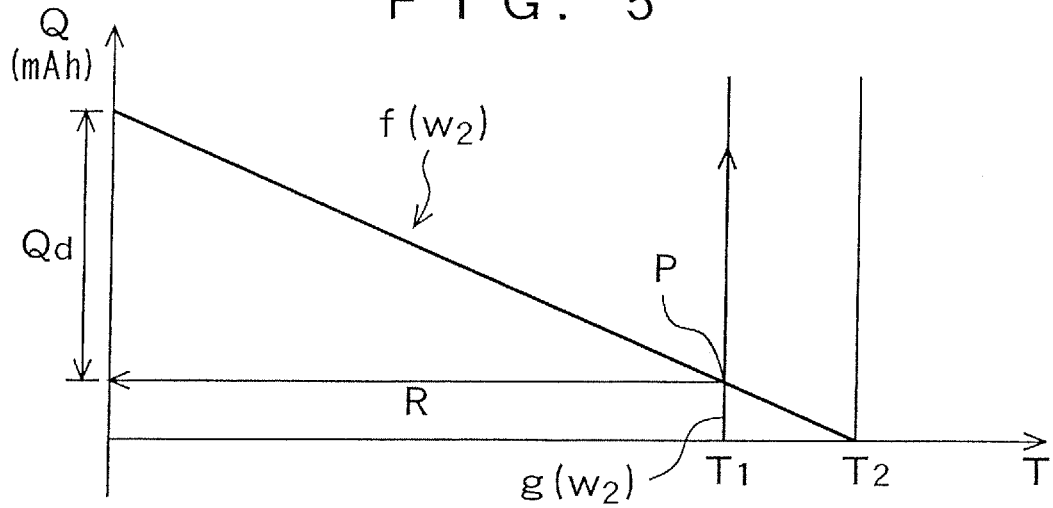
FIG. 5 is a graph showing a discharge characteristic of a battery pack when an electronic apparatus operates in a second display mode using only an LCD panel wherein the characteristic is represented based on a remaining battery capacity as a function of time.
Figure 6:
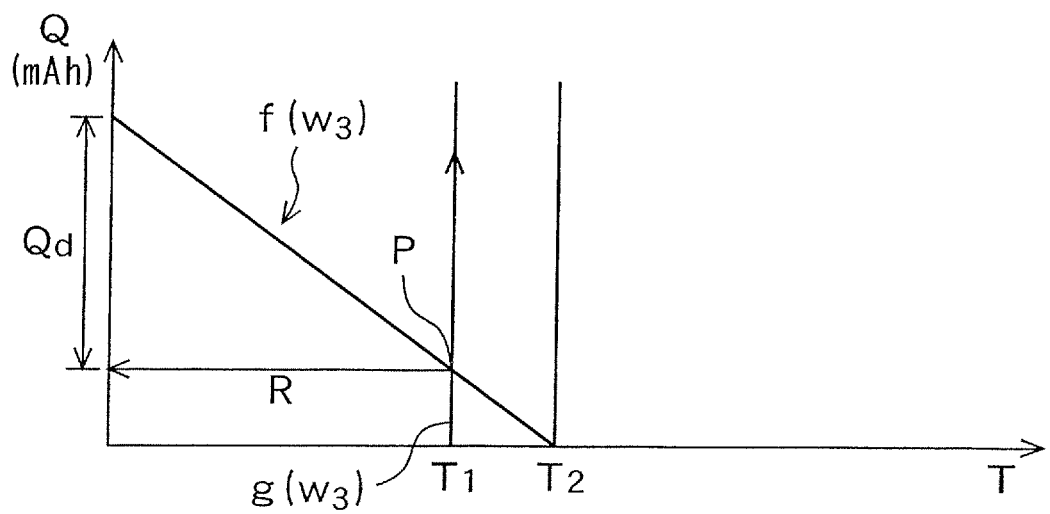
FIG. 6 is a graph showing a discharge characteristic of a battery pack when an electronic apparatus operates in a third display mode using both the viewfinder and the LCD panel wherein the characteristic is represented based on a remaining battery capacity as a function of time.

FIG. 4 shows a discharge characteristic f(w1) of the battery pack 50 in the first display mode using the viewfinder 13. FIG. 5 shows a discharge characteristic f(w2) of the battery pack 50 in the second mode using the LCD panel 16. FIG. 6 shows a discharge characteristic f(w3) of the battery pack 50 in the third display mode using both the viewfinder 13 and the LCD panel 16. FIG. 7 shows the discharge characteristic f(w4) of the battery pack 50 in the fourth display mode using the communication line. This discharge characteristic f(w4) is similar to that of the third display mode because the power consumption rates in the third and the fourth display modes are similar to each other.

Thus, the power consumption rate of the main body 10 using only the LCD panel 16 is larger than that using only the viewfinder 13. The power consumption rate using both the viewfinder 13 and the LCD panel 16 is larger than that using only the LCD panel 16. The gradient of the discharge characteristic (hereinafter referred to as "power dependent coefficient") f(w) becomes steeper with the power consumption rate being increased. Thus, the remaining battery power, namely, an estimated amount of remaining battery time of the battery pack 50 in a single charge relative to the remaining battery capacity Q decreases with f(w). If power consumption rate is large, then the remaining battery capacities from time T1 corresponding to the battery's end time to the time T2 corresponding to the complete discharge of its charge are also influenced by the internal impedance of the battery pack 50.

The estimated amount of remaining battery time R in which the video camera 1 will be available can be calculated by the following equation (1) associated with a given display mode of i (in the illustrated cases, the display modes are the first through fourth display modes):

$$R = Qd \times f(Wi) \qquad (1)$$
$$= (Q - g(Wi)) \times f(Wi)$$

where

Qd indicates remaining battery capacity until the battery's end (a remaining battery capacity Q minus the remaining battery capacity g(wi));

Wi indicates power consumption rates (fixed value) of the video camera in the respective display modes;

f(Wi) indicates a power dependent coefficient (fixed value) in the respective display modes;

Q indicates a remaining battery capacity of the battery pack; and g(Wi) indicates the remaining battery capacity (fixed value) of the battery pack at the time of battery end in the respective display modes.

As described above, W1 represents the power consumption rate in the first display mode using the viewfinder 13; W2 represents the power consumption rate in the second display mode using only the LCD panel 16; W3 represents the power consumption rate in the third display mode using both the viewfinder 13 and the LCD panel 16; and W4 represents the power consumption rate in the fourth display mode using a communication line. The values of the power consumption rates W1-W4 are pre-installed in a memory (not shown) of the calculation circuit 23.

In calculating the estimated amount of remaining battery time R or the period of time in which the video camera will be able to record information in a single charge, starting from time corresponding to the remaining battery capacity Q and reaching time T1 corresponding to the point P corresponding to the battery's end voltage of the battery pack 50, according to the equation (1), it can be calculated more accurate if the temperature change of the battery cell(s) 51 contained in the battery pack 50 is taken into account. Thus, the estimated amount of remaining battery time R can be calculated by equation (2) below.

$$Q = Qd \times f(Wi) \times h1(T) \qquad (2)$$
$$= (Q - g(Wi) \times h2(T)) \times f(Wi) \times h1(T)$$

where T indicates a temperature of the battery cell portion, "i" indicates each of the display modes (in the illustrated cases, the display modes are the first through fourth display modes), h1(T) is a temperature coefficient of the power dependent coefficient f(Wi), and h2(T) is a temperature coefficient of the remaining battery capacity g(Wi). The values of the remaining battery capacity Q and the temperature coefficients h1(T) and h2(T) are respectively transmitted from the battery pack 50 to the main body 10. The power dependent coefficients f(Wi) and the remaining battery capacity g(Wi) are pre-installed in the calculation circuit 23 together with the power consumption rates Wi.

Upon receipt of the estimated amount of remaining battery time R calculated by the calculation circuit 23, the display control circuit 24 generates remaining-battery-power-indicating information to be displayed on the viewfinder 13 and/or the LCD panel 16 based on signal for the estimated amount of remaining battery time (or remaining battery power signal), as shown in FIG. 2.

Upon receipt of ON/OFF information from the pressure switch (ocular sensor) 13a, a control circuit 26 controls ON/OFF operations of a switch 32 for switching the power supplied to a drive circuit 27 of the viewfinder 13, based on the above ON/OFF information.

Based on the ON/OFF signal received from an OPEN/CLOSE detection switch 17a for detecting open or close status of the LCD panel 16, the control circuit 26 controls ON/OFF operations of a switch 33 for switching the power supplied to a drive circuit 28 of the LCD panel 16.

The main body 10 equipped with the above microcomputer 21 is further provided with the drive circuits 27 and 28 for driving the viewfinder 13 and the LCD panel 16, respectively, and a DC/DC converter 29 for supplying power to the respective drive circuits 27 and 28.

The operations of the switches 32 and 33 for switching on and off the drive circuits 27 and 28, respectively, are controlled based on the output of the control circuit 26.

Since the video camera 1 is configured to support data transfer via a communications line such as the Internet, the main body 10 is provided with data communication unit (radio communications unit) 42 as shown in FIG. 2. The control circuit 26 of the microcomputer 21 may retrieve information stored in the recording medium 41 in response to instructions received from an operation unit 31. The information thus retrieved is transmitted from a built-in antenna 43 via the data communication unit 42 to an indoor relay station. Thus, the user can send information (including images taken by the video camera) to his or her friend(s) from a mobile station.

Of course, it is possible to establish wired connection to the Internet. Thus, wireless and wired data communications are possible. Incidentally, when the LCD panel 16 is a touch panel, it may also serve as the operation unit 31.

Figure 8:
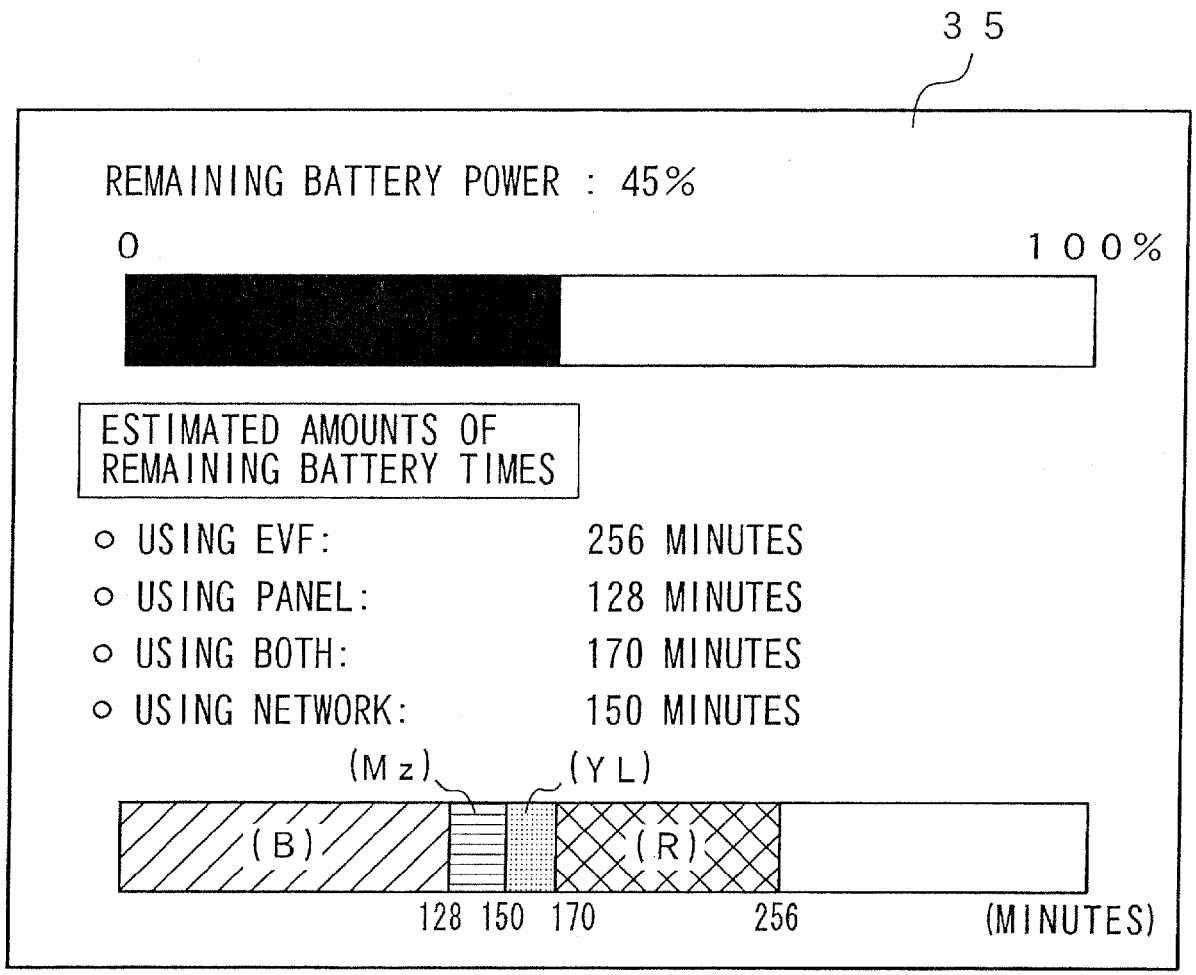
FIG. 8 shows remaining battery power information for every display mode displayed on each of the viewfinder and the LED.

The estimated amounts of remaining battery times calculated by the display control circuit 24 for multiple display modes are displayed on a display screen 35 of the viewfinder 13 and/or the LCD panel 16, as shown in FIG. 8, based on the remaining battery power information. A typical example of the display screen 35 will be further described below.

The estimated amounts of remaining battery times for the respective display modes are numerically displayed on the display screen 35. In the example shown herein, the estimated amount of remaining battery time in the first display mode using only the viewfinder 13 is shown under a subtitle "USING EVF". Similarly, the remaining battery power in the second display mode using only the LCD panel 16 is shown under a subtitle "USING PANEL". The remaining battery power in the third display mode using both the viewfinder 13 and the LCD panel 16 simultaneously is shown under a subtitle "USING BOTH".

In addition, the estimated amounts of remaining battery times are shown by different colored strips in a composite bar chart. For example, the estimated amounts of remaining battery times in the first, second, and third display modes are colored red, blue, and yellow, respectively. In the above example, the respective estimated amounts of remaining battery times are also shown numerically on the bar chart.

It is seen that the display screen 35 also shows the estimated amounts of remaining battery times in the fourth display mode transferring the imaged information using a communication line under a subtitle "USING NETWORK". Since the LCD panel 16 is also used in the fourth display mode while communicating information, the estimated amounts of remaining battery times for this mode are also indicated numerically. It will be appreciated that the estimated amounts of remaining battery times can be known to the user, he or she can avoid a battery failure while, for example, transmitting the latest information from a hotel to his friend. The estimated amounts of remaining battery times in the fourth display mode can be also shown in the same bar chart as described above. In FIG. 8, the remaining battery power in the fourth display mode is shown in magenta (Mz).

Also shown in the display screen 35 numerically as well as in a bar chart is information on a current remaining battery power of the battery pack 50 relative to its maximum possible charged state as a current battery status. The information can be represented in at least four levels, possibly infinitely many levels, according to the estimated amounts of remaining battery times.

In principle, all these representations of the estimated amounts of remaining battery times are always displayed at the same instance on the display screen 35. However, if all the representations cannot be displayed at the same instance on account of the display screen 35 being limited in area, they can be selectively displayed or only the estimated amounts of remaining battery times can be displayed for the respective display modes except for the bar representation.

Referring back to FIG. 2, there is shown an information generation unit 71 constituting a microcomputer 55 built in the battery pack 50. The information generation unit 71 calculates or generates the battery information Sout' such as the remaining battery capacity and the temperature coefficients of the battery cell(s) 51 from the output (referred to as "voltage detection output") of a voltage detection circuit 52 indicative of voltage of the battery cell(s) 51, the output of a temperature sensor 53, and the output of a charge and discharge current detection circuit 54. When a request signal Sout is supplied from the microcomputer 21 of the main body 10 to the microcomputers 55 via a buffer amplifier 57a, a communication circuit 73 is activated to supply the above described battery information Sout' to the microcomputer 21 via the buffer amplifier 57b and communication terminals 57 and 19.

It is noted that the battery pack 50 is provided with a memory (not shown) for storing data (i.e. cycle data) defining the maximum usable number of charge/discharge cycles of the battery cell 51. The number of charging/discharging cycles of battery cell 51 is measured based on the cycle data and the voltage detection output received from the voltage detection circuit 52. When the number of charging/discharging cycles has reached the maximum usable number of charging/discharging cycles indicated in the cycle data, final battery life information is transmitted to the microcomputer 21 of the main body 10. The final battery life information is displayed on the viewfinder 13 and/or the LCD panel 16 of the main body 10. Thus, the user can easily recognize the final battery life of the battery pack 50.

The video camera 1 configured as described above also displays the remaining battery power (estimated amounts of remaining battery times of the battery pack 50) for different display modes on the viewfinder 13 and/or LCD panel 16 while the battery pack 50 is being charged in the battery mount 15, or while the video camera 1 is in use or on the standby condition. When the battery pack 50 is being charged with it being installed in the main body 10, the main body 10 is automatically switched to a remaining battery power indication mode. When the main body 10 is in operation or on the standby condition, the main body 10 is switched to a remaining battery power indication mode by manipulating, for example, a monitor switch (not shown) for indicating the remaining battery power, which is provided in the main body 10. The monitor switch may be shared by an existing switch.

Figure 9:
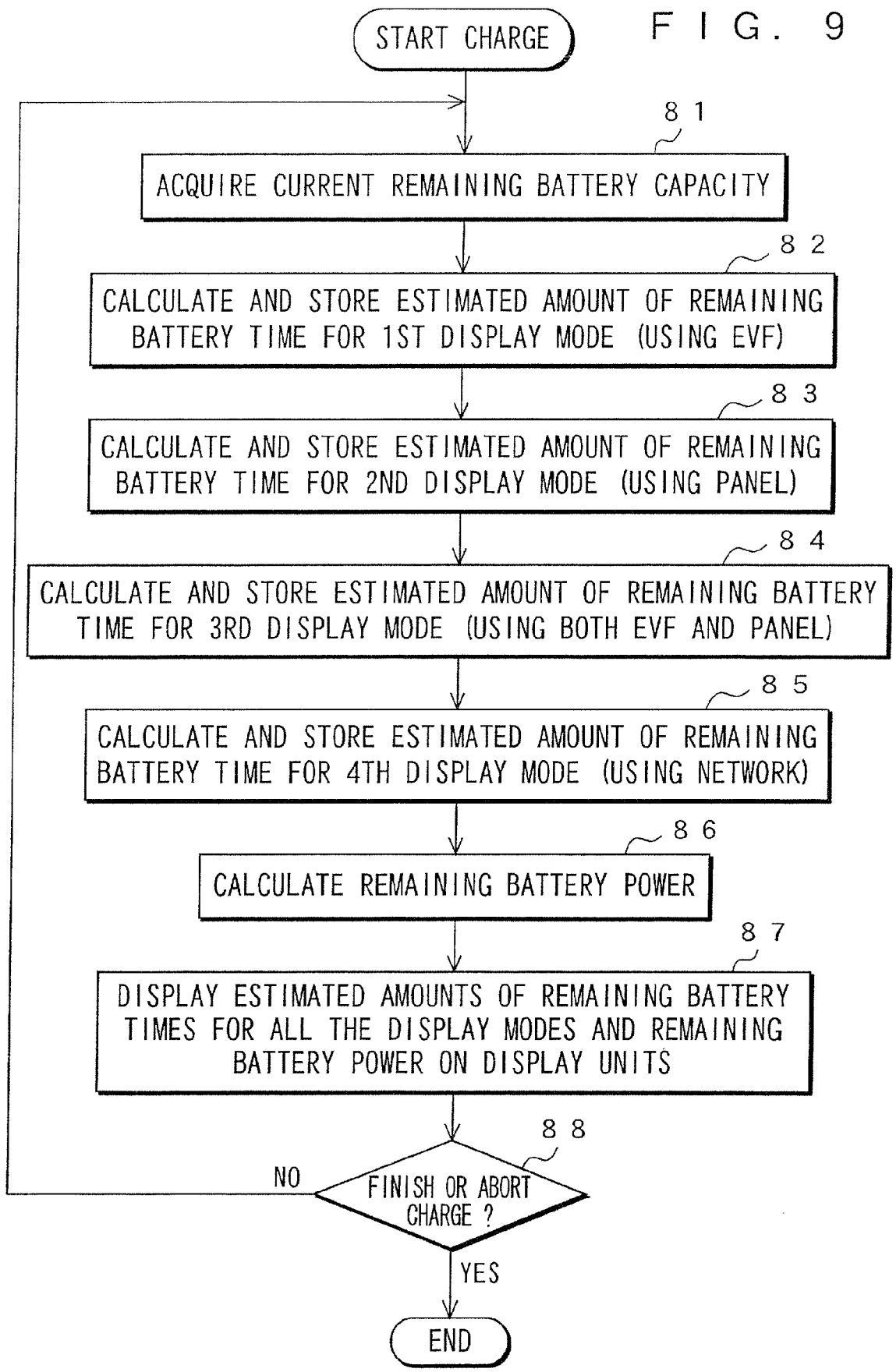
FIG. 9 is a flowchart showing a procedure of obtaining the remaining battery power information.

FIG. 9 shows a procedure of such the remaining battery power indication mode carried out by the microcomputer 21 during battery charging.

As a battery charging mode is started to charge the battery pack 50 using a battery charger, for example, the microcomputer 21 acquires data regarding the current remaining battery capacity from the battery pack 50 (Step 81). The calculation circuit 23 then calculates and stores the estimated amounts of remaining battery times for the first display mode (Step 82).

For instance, in the first display mode, i.e. in the EVF display mode, the estimated amount of remaining battery time R1 is calculated by the following equation in terms of the remaining battery capacity Q, temperature coefficients h1(T) and h2(T), a pre-installed power dependent coefficient f(W1), and the remaining battery capacity at the battery's end g(W1).

$$R1 = (Q - g(W1) \times h2(T)) \times f(W1) \times h1(T)$$

Similar calculations are carried out for the second through the fourth display modes to obtain the respective estimated amounts of remaining battery times R2-R4 (Steps 83-85). After calculating the estimated amounts of remaining battery times R1-R4 for all the display modes, current remaining battery power of the battery pack 50 is calculated (Step 86). Subsequently, all the contents thereof are displayed in the respective display units (the viewfinder 13 and the LCD panel 16, etc.) as shown in FIG. 8 (Step 87). The display refresh cycle time of the display units (the viewfinder 13 or the LCD panel 16) is about 500 msec. The remaining battery power indication is ended when the charging of the battery is finished or aborted (Step 88).

According to the embodiment, the user can easily grasp the estimated amounts of remaining battery times in the battery pack for each of the display modes from the information displayed on the display units. The user can clearly recognize which display mode allows him or her to complete his picture-taking job under the current battery charging status. If he or she is in a hurry, he or she can cut down charging, thereby avoiding excessive charging than needed. If the video camera is switchably used in different display modes, an amount of remaining battery time in the battery pack can be conveniently estimated.

Any of the estimated amounts of remaining battery times in the battery pack for the respective display modes can be presented on the corresponding display unit as needed, not only when the battery is being charged but also when the video camera 1 is in use or on standby condition, as described above.

It will be recalled that the power dependent coefficients f(Wi) and the remaining battery capacity at the battery's end g(Wi) associated with the viewfinder 13 and/or the LCD panel 16 are pre-installed in the calculation circuit 23 of the microcomputer 21, and that the estimated amounts of remaining battery times R is calculated from these pre-installed data. Hence, the remaining battery power information displayed on the viewfinder 13 and/or the LCD panel 16 is prevented from fluctuating if, for example, the LCD panel is frequently opened and closed by the user.

Although the invention has been described above assuming that the calculation circuit 23 stores fixed values W1-W4 of power consumption rates for the first through fourth display modes and calculates remaining battery power based on these values, the invention is not limited to this example. For example, the number of display modes is arbitrary.

In the example shown herein above, only display units in the forms of the electronic viewfinder 13 and the LCD panel 16 have been described. A strip-shaped display unit for displaying the remaining battery power, however, can be provided on the outer surface of the LCD panel 16 so that it can be seen if the LCD panel 16 is closed. In this case, the remaining battery power for different display modes can be selectively displayed, since it has only a limited area.

The invention has been described in detail with reference to a specific embodiment of the invention in the form of the video camera 1 having a communication function. It should be understood that the invention is not be limited to this embodiment and that the invention can be applied equally well to other types of electronic apparatuses including video cameras having no communication function, and other electrical equipment such as cellular phones and portable digital assistants.

Thus has been described an electronic apparatus having a battery power level indicating function. While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A portable electronic apparatus with a removable battery pack for supplying power to the portable electronic apparatus, the portable electronic apparatus having plurality of functions including functions of recording an image, displaying the image and transferring the image via a network, the portable electronic apparatus comprising:
a main body having a plurality of display units;
at least one of said display units has opening and closing positions relatively to the main body;
a detector detecting an opening/closing status of said at least one of said display units and generating a corresponding signal so that result of the detection is utilized for controlling on/off of said at least one of the display units;
a remaining battery power information generator calculating remaining battery capacity for each display mode of a plurality of display modes of the display units, the plurality of display modes including a first display mode using a first display unit, a second display mode using a second display unit, and a third display mode using the first display unit for communicating information via a communication unit; and
wherein information of a current remaining battery status of the battery pack for each display mode relative to a full charged state (a) is displayed automatically when the battery pack is being charged and (b) is displayed when a monitor switch is manipulated in one of an operation mode and a standby mode.

2. The portable electronic apparatus according to claim 1, wherein the remaining battery power information generator calculates estimated amounts of remaining battery times and the information on a current remaining battery power is displayed in a plurality of levels according to the estimated amounts of remaining battery times.

3. The portable electronic apparatus according to claim 1, wherein in the third display mode, image data is transmitted, via the communication unit to the Internet, based on an operation on the first display unit.

4. The portable electronic apparatus according to claim 1, wherein the plurality of display modes further includes a forth display mode using both the first and second display units.

5. The portable electronic apparatus according to claim 1, wherein the first display has a touch panel function.

6. The portable electronic apparatus according to claim 1, wherein the communication unit can establish wired connection to the Internet and image data is transmitted by using the Internet.

7. The portable electronic apparatus according to claim 1, further comprising a storage which stores each power consumption rate information of the three display modes and wherein the remaining battery power information generator calculates estimated amounts of remaining battery times according to the display mode and corresponding power consumption rate information.

8. The portable electronic apparatus according to claim 1, wherein one of said display units is capable of being used as a viewfinder in an image recording operation.

9. The portable electronic apparatus according to claim 1, wherein the information of the current remaining battery status is displayed for each display mode, one of simultaneously and selectively.

10. A portable electronic apparatus with a removable battery pack for supplying power to the portable electronic apparatus, the portable electronic apparatus comprising:
a main body having a plurality of display units;
at least one of said display units has opening and closing positions relatively to the main body;
a detector for detecting an opening/closing status of said at least one of said display units and generating a corresponding signal so that result of the detection is utilized for controlling on/off of said at least one of the display units;
a remaining battery power information generator calculating remaining battery capacity for each display mode of a plurality of display modes of the display units, the plurality of display modes including a first display mode using a first display unit, a second display mode using a second display unit, and a third display mode using the first display unit for communicating information via a communication unit; and
wherein information of a current remaining battery status of the battery pack for each display mode relative to a full charged state (a) is automatically displayed simultaneously or selectively when the battery pack is being charged and (b) is displayed simultaneously or selectively when a monitor switch is manipulated in one of an operation mode and a standby mode.

11. The portable electronic apparatus according to claim 10, wherein the remaining battery power information generator calculates estimated amounts of remaining battery times and the information on a current remaining battery power is displayed in a plurality of levels according to the estimated amounts of remaining battery times.

12. The portable electronic apparatus according to claim 10, wherein in the third display mode, image data is transmitted, via the communication unit to the Internet, based on an operation on the first display unit.

13. The portable electronic apparatus according to claim 10, wherein the plurality of display modes further includes a forth display mode using both the first and second display units.

14. The portable electronic apparatus according to claim 10, wherein the first display has a touch panel function.

15. The portable electronic apparatus according to claim 10, wherein the communication unit can establish wired connection to the Internet and image data is transmitted by using the Internet.

16. The portable electronic apparatus according to claim 10 further comprising a storage which stores each power consumption rate information of the three display modes, and wherein the remaining battery power information generator calculates estimated amounts of remaining battery times according to the display mode and corresponding power consumption rate information.

17. The portable electronic apparatus according to claim 10, wherein one of said display units is capable of being used as a viewfinder in an image recording operation.

* * * * *